US008590713B2

(12) United States Patent
Ford

(10) Patent No.: US 8,590,713 B2
(45) Date of Patent: Nov. 26, 2013

(54) CENTRIFUGAL SEPARATOR

(75) Inventor: Steven D. Ford, Fresno, CA (US)

(73) Assignee: Claude Laval Corporation, Fresno, CA (US)

( * ) Notice: Subject to any disclaimer, the term of this patent is extended or adjusted under 35 U.S.C. 154(b) by 793 days.

(21) Appl. No.: 12/788,075

(22) Filed: May 26, 2010

(65) Prior Publication Data

US 2011/0294643 A1 Dec. 1, 2011

(51) Int. Cl.
*B01D 21/26* (2006.01)

(52) U.S. Cl.
USPC .......................... 210/512.1; 210/788; 209/727

(58) Field of Classification Search
USPC ................................ 210/512.1, 788; 209/727
See application file for complete search history.

(56) References Cited

U.S. PATENT DOCUMENTS

| | | | |
|---|---|---|---|
| 3,512,651 | A | 5/1970 | Laval, Jr. |
| 4,072,481 | A | 2/1978 | Laval, Jr. |
| 4,784,634 | A | 11/1988 | Schiele |
| 5,618,409 | A | 4/1997 | Kreill |
| 5,637,217 | A | 6/1997 | Herman |
| 6,143,175 | A | 11/2000 | Ford et al. |
| 6,666,338 | B1 | 12/2003 | Henriksson et al. |
| 7,025,890 | B2 | 4/2006 | Moya |
| 7,335,313 | B2 | 2/2008 | Moya |
| 2008/0171645 | A1 | 7/2008 | Borgstrom et al. |

*Primary Examiner* — David A Reifsnyder
(74) *Attorney, Agent, or Firm* — James M. Duncan, Esq.; Klein DeNatale Cooper

(57) ABSTRACT

A centrifugal separator having a separation chamber and a collection chamber utilizes an axially-oriented structure which extends from the spin structure, or spin plate, up and into the vortex finder. The axially-oriented structure decreases turbulence within portion of the separator in axial adjacency with the spin structure, including the separation chamber in which the solids are collected. The reduction of turbulence substantially reduces the entrainment of solids in the rising stream of liquid flowing to the vortex finder, and thus increases the efficiency of the separator. The spin structure may comprise a truncated cone mounted with a portion of the truncated cone in the separation chamber and the remainder in the collection chamber.

18 Claims, 6 Drawing Sheets

-Prior Art-

CENTRIFUGAL SEPARATOR

BACKGROUND OF THE INVENTION

The disclosed device generally relates to devices used to separate solids from liquids, and specifically to an improved centrifugal separator which includes internal structure which enable the attainment of preferred flow regimes through the separator, resulting in superior separation of solids from the liquid and greater efficiency in operation of the separator.

Centrifugal separators are generally known as a means to separate solids from flowing streams of fluid in which the solids are entrained. The typical configuration of a centrifugal separator is to inject a stream of the influent through a nozzle tangentially into a cylindrical separation barrel. As the injected stream whirls around the inside wall of the separation barrel, the high g forces within the stream cause the solid particles to migrate toward the wall as the whirling stream flows from one end of the separation barrel to the other, typically from an upper elevation to a lower elevation within the separation barrel. The force required to move the particles to the side wall is defined by the equation $F=mv^2/r$, where m equals the mass of the particle, v is the tangential velocity of the particle, and r is the radius of the separator.

At or near a lower end of the separation barrel there is a spin plate which induces a spiral motion to the stream, thus creating a vortex, the liquid of which flows away from the spin plate toward a centrally located structure typically referred to as the vortex finder, and into the exit port. The filtrate exiting the separator is, ideally, substantially free from entrained solids. There is an opening or slot near the spin plate at the lower end of the barrel through which a substantial portion of the entrained solids which are nearer the wall of the separator barrel will pass. These solids accumulate at the bottom of the barrel within a collection chamber. This general type of centrifugal separator is shown in U.S. Pat. Nos. 4,072,481, 5,811,006 and 6,143,175, which are incorporated herein by reference in their entireties for their showing of the theory and practice of such separators.

The function and efficiency of this type of separator are in large part derived from the velocity and smoothness of flow of the stream within the separator. The desired flow regime within the separator is laminar flow, which is characterized by smooth, constant fluid motion. On the other hand, turbulent flow produces random eddies and flow instabilities. Turbulence anywhere in the system results in the need for more power to provide a higher injection pressure, or a reduction in separation efficiency. As turbulence increases, particle entrainment increases in the stream reflected from the spin plate and exiting the separator through the vortex finder.

The increase in power demand can be significant, particularly where high flow rates are required, such as in cooling tower applications where the required flow rate may be 13,000 gpm or higher. Turbulence in the separator can significantly impact the energy demands of the pumps required to drive the stream through the separator.

Turbulence also aggravates abrasion of the internal components of the separator. The solids entrained in the influent are abrasive. In order to generate the substantial g forces required for centrifugal separation of the solids from the liquid, the velocity of the particles and the force of their contact with parts of the separator will result in a substantial wear rate that can only partially be compensated for by the use of abrasion resistant materials such as steel alloys. Thus, non-turbulent and smooth flow results in reduced wear throughout the entire system. However, notwithstanding improvements which have been made in the art in reducing turbulence throughout various zones within the separator, the inventor herein has discovered that there remain portions of the known cylindrical centrifugal separators which continue to present a challenge in achieving non-turbulent flow. In particular, as the whirling stream approaches the portion of the separator in axial adjacency to the spin plate, the smooth flow is prone to transition into turbulent flow, resulting in reduced separation efficiency and abrasion of the spin plate and associated structures. It is desirable that the collection chamber be maintained in a quiescent condition to facilitate the settling of the solids in the collection chamber, and reduce the re-entrainment of solids into the liquid which is returned from the collection chamber to the separation chamber.

It follows that reduction of turbulence throughout the system can importantly improve separation, reduce power cost, extend the time between repairs, and extend the useful life of the device. The present invention is directed toward reducing turbulent flow throughout centrifugal separators, particularly in the portions of the separator adjacent to the spin plate.

SUMMARY OF THE INVENTION

A centrifugal separator which incorporates this invention includes a separator barrel. This barrel has a cylindrical internal wall which forms an axially-extending separation chamber. The stream is injected tangentially into the separation chamber, typically at an upper elevation, swirling down the wall in a helical pattern to a portion of the barrel, usually, but not necessarily, at a lower elevation, where the stream encounters a central structure for reversing the direction of flow of the stream, and inducing rotation in the stream. This structure is referred to herein as the spin structure or as the spin plate. Below the spin plate there is a collection chamber and there is conduit means between the spin plate and the internal wall through which the solids can pass through to the collection chamber. In accordance with known principles, the spin plate causes the central portion of the whirling stream to reverse its axial direction, and flow upwardly through an outlet barrel centrally aligned within the separator barrel, exiting the separator through outlet port at the top of the separation chamber.

In accord with the present invention, a rod having an upper end and lower end is disposed within the separation barrel such that the rod is centrally aligned within the separation barrel, and the lower end of the rod is affixed to or disposed within the spin structure and the upper end is positioned within a portion of the outlet barrel. As noted above, the term spin plate may refer to the spin structure. However, because the term suggests a two-dimensional configuration, the term spin plate may refer specifically to the top surface of the spin structure, while the term "spin structure" may also refer to three dimensional structures, such as the conical embodiments disclosed herein.

Surprisingly, the inventor herein has observed that the presence of the axially-centered rod between the spin plate and the outlet barrel reduces the occurrence of turbulence in the portion of the separation barrel in axial adjacency with the spin plate. Moreover, the presence of the rod stabilizes the axial position of the vortex. This stabilization reduces the tendency of the vortex, particularly in the portion of the separation barrel near the spin plate, to migrate into the path of the oncoming solids-laden stream, which is flowing tangentially along the inner wall toward the spin plate.

Decreasing the turbulence in the barrel adjacent to the spin plate and also decreasing the intrusion of the vortex into the oncoming solids-laden stream substantially reduces the entrainment of solids in the vortex, and thus increases the efficiency of the separator. The inventor herein has further found that there is even greater stabilization of the vortex and reduced tendency for turbulent flow to be induced if the spin plate itself is formed by the top surface of a truncated cone, where the truncated cone comprises the top surface, a base, and a conical surface extending from the base to the top surface and the truncated cone is disposed between the separation chamber and the collection chamber. The collection chamber may also have a larger diameter than the separation barrel.

The above and other features of this invention will be fully understood from the following detailed description and the accompanying drawings.

DETAILED DESCRIPTION OF THE EMBODIMENTS

Description of the Prior Art Separator

Figure 1:
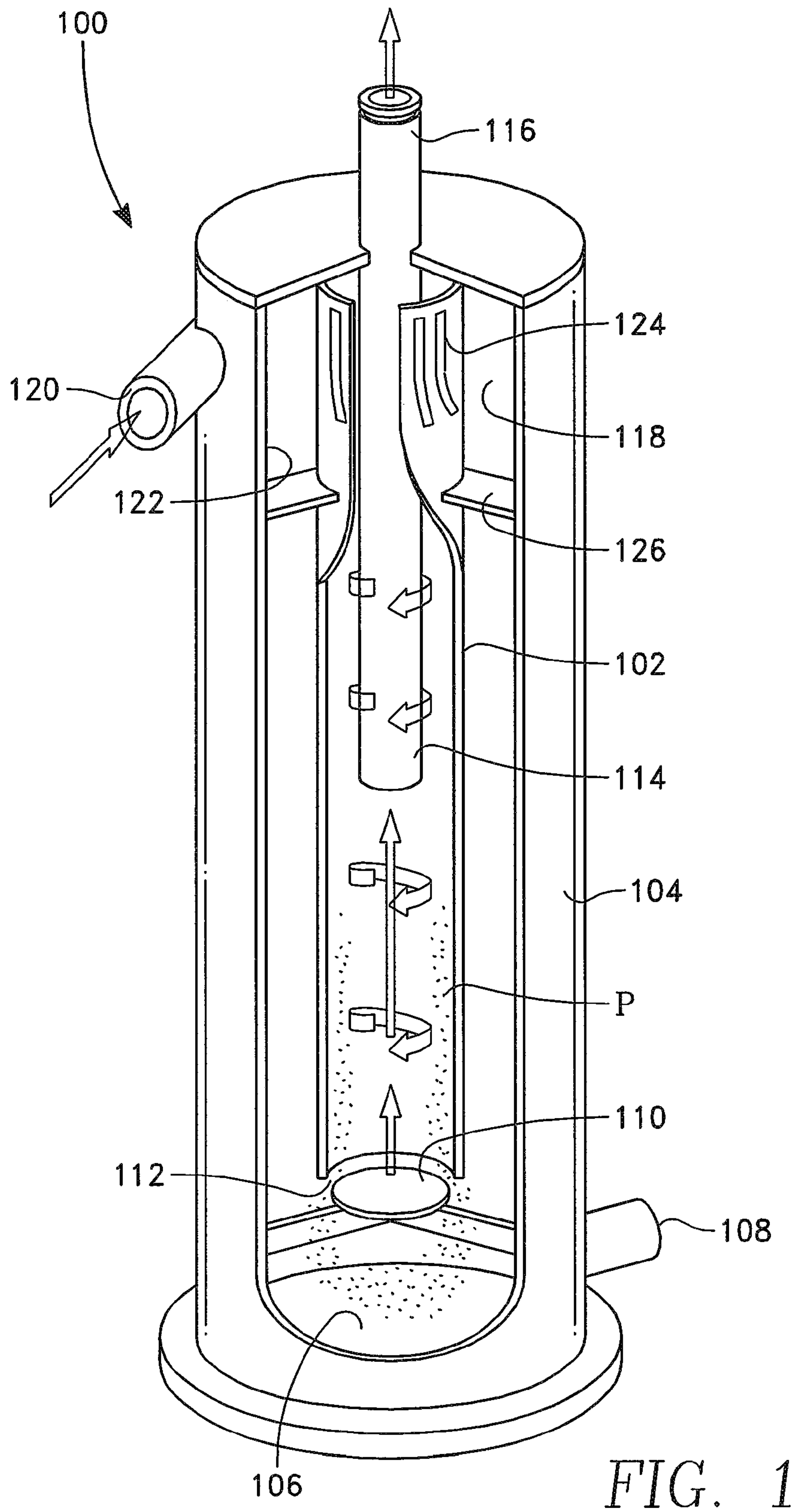
FIG. 1 depicts a known centrifugal separator.

FIG. 1 depicts a known centrifugal separator 100. Its basic functional element is a separation barrel 102 which is contained within an outer housing 104. A collection chamber 106 is placed at the lower end of the outer housing 104 where the collection chamber collects separated solids P, from the downward liquid flow, which is illustrated by the clockwise arrows within the separation barrel. This downward liquid flow may contain a high concentration of entrained solids, which are forced against the interior wall of the separation barrel by centrifugal force. A drain port 108 at the bottom end of the collection chamber 106 enables the solids and some liquids to be drawn from it, either continuously or from time to time. At or near the lower end of the separation barrel 102 there is a spin plate 110 which extends normal to the central axis of the separation barrel. A slot 112 or other conduit means is left between the spin plate 110 and the separation barrel 102 to allow the passage of solids from the separation barrel into the collection chamber 106. An outlet barrel 114 is centrally located within the upper end of the separation barrel 102. The outlet barrel 114 includes an exit tube 116 for exit of treated liquids.

An acceptance chamber 118 is formed by the outer housing 104 around the upper end of the separation barrel 102. The acceptance chamber 118 is annularly-shaped and fits around and in fluid-sealing relationship with the separation barrel 102 and is separated from the lower portion of the outer housing 104 by dividing wall 126. An injector nozzle 120 through the wall of the outer housing 104 is directed tangentially into the acceptance chamber 118. The injector nozzle 120 injects the solid-laden liquid stream under pressure into the acceptance chamber 118. This creates a circular flow between wall 122 of the outer housing 104 and the outside wall of the separation barrel 102. Entrance slots 124 through the wall of the separation barrel 102 pass the stream from the acceptance chamber 118 into the separation barrel.

The separation of solids from liquids is derived from fields of g force. The stream is injected into the separation barrel 102 at a high velocity, and whirls as a swiftly flowing helically moving stream from the upper end to the lower end of the separation barrel. In the separation barrel, the centrifugal forces are much greater than the gravitational force, and particles P are forced outwardly by centrifugal action.

The smaller the diameter of the separation barrel 102, the greater the centrifugal force becomes for the same linear speed along the inner surface of the barrel. At or near a lower end of the separation barrel 102, the spin plate 110 induces a spiral motion to the stream, thus creating a vortex. The liquid of the vortex flows away from the spin plate upward towards the outlet barrel 114, as depicted by the upwardly pointing arrows in FIG. 1. The outlet barrel 114 is also referred to as the vortex finder. In a properly operating separator, the liquid stream flowing out through exit tube 116 is substantially free of solids.

Description of the Invention

Figure 2:
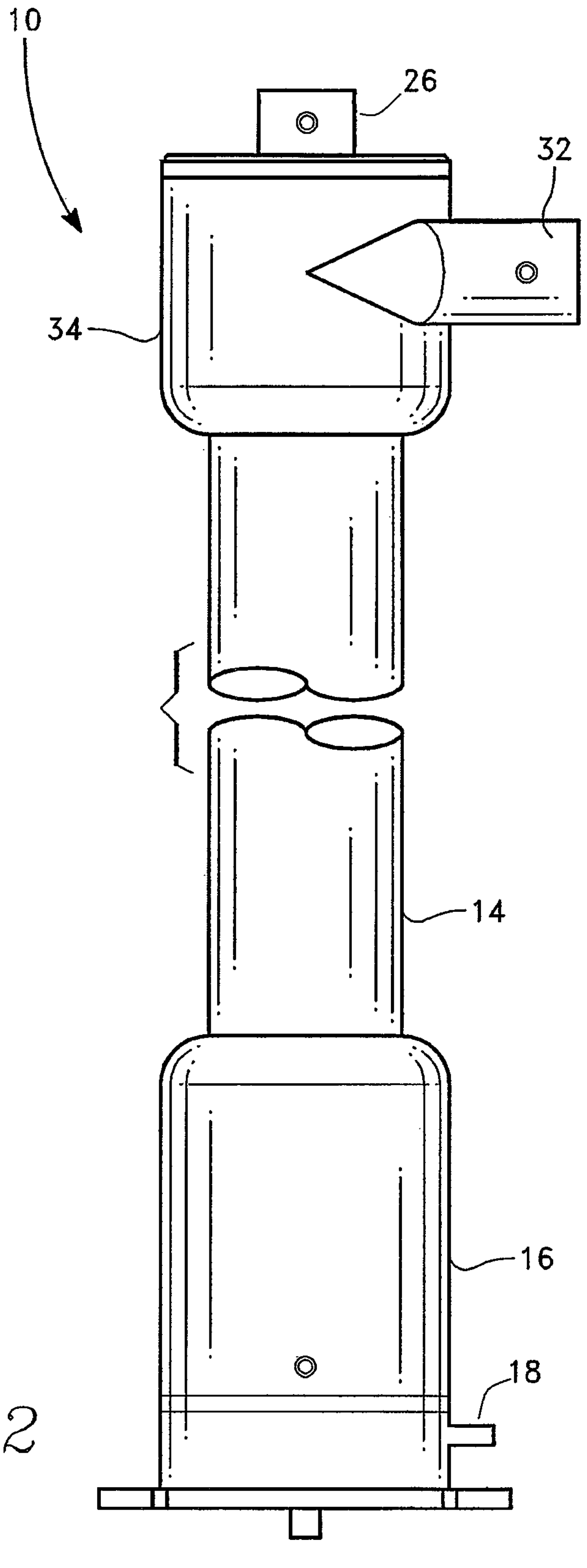
FIG. 2 shows an external view of an embodiment of the disclosed centrifugal separator.
Figure 3:
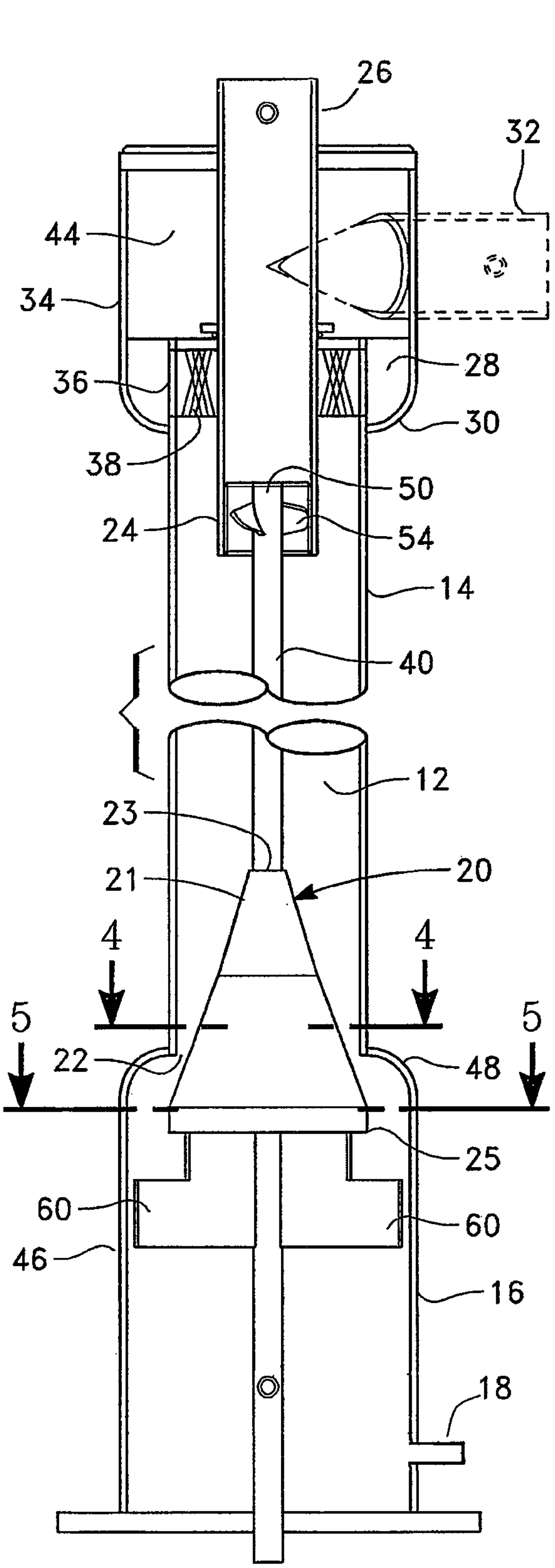
FIG. 3 shows a sectional view of the embodiment depicted in FIG. 2.
Figure 4:
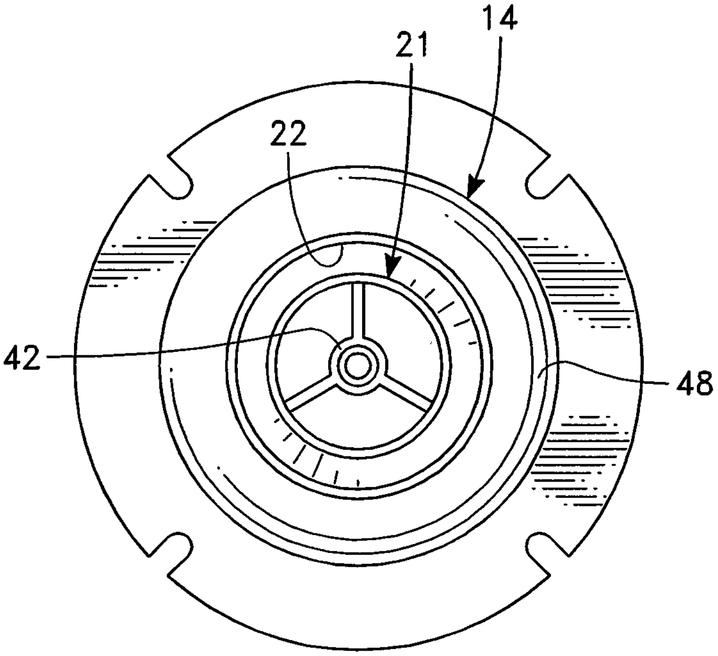
FIG. 4 shows a sectional view along line 4-4 of FIG. 3.
Figure 5:
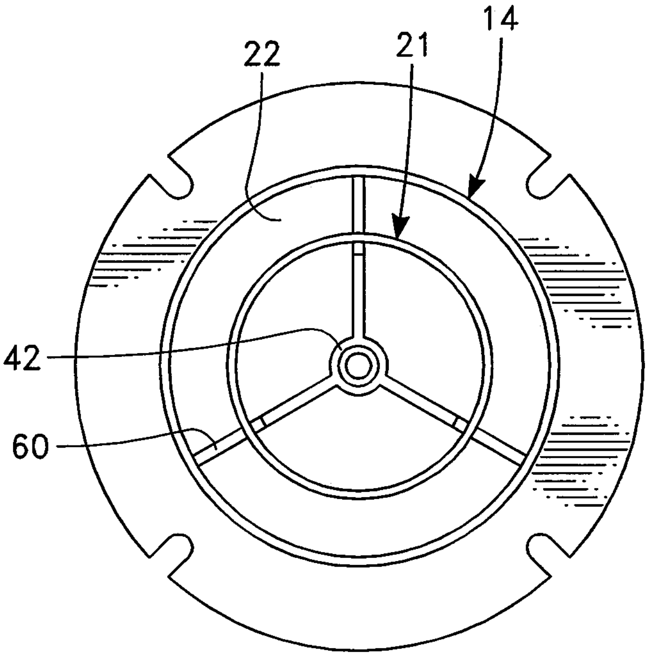
FIG. 5 shows a sectional view along line 5-5 of FIG. 3.
Figure 6:
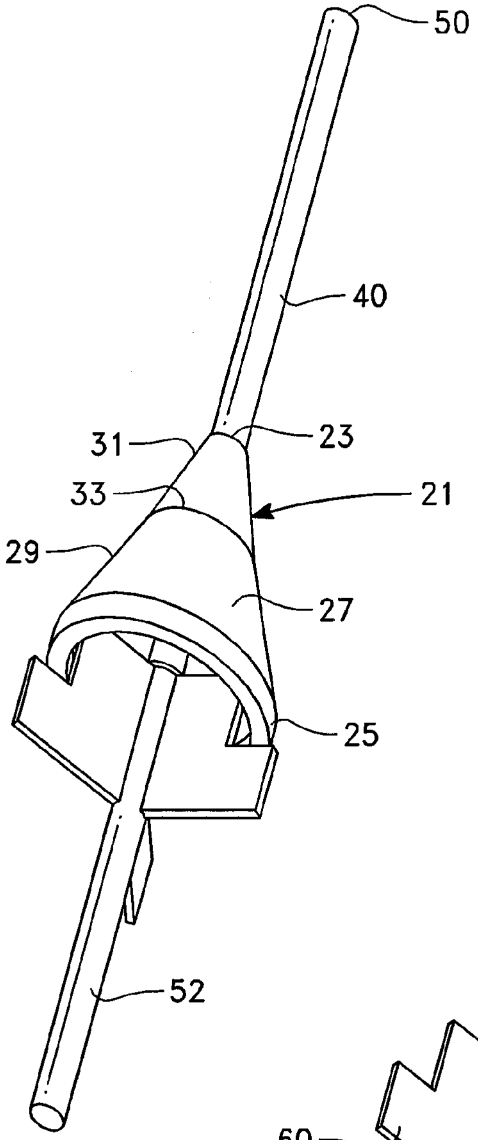
FIG. 6 shows an embodiment of rod and conical spin plate of the present invention.
Figure 7:
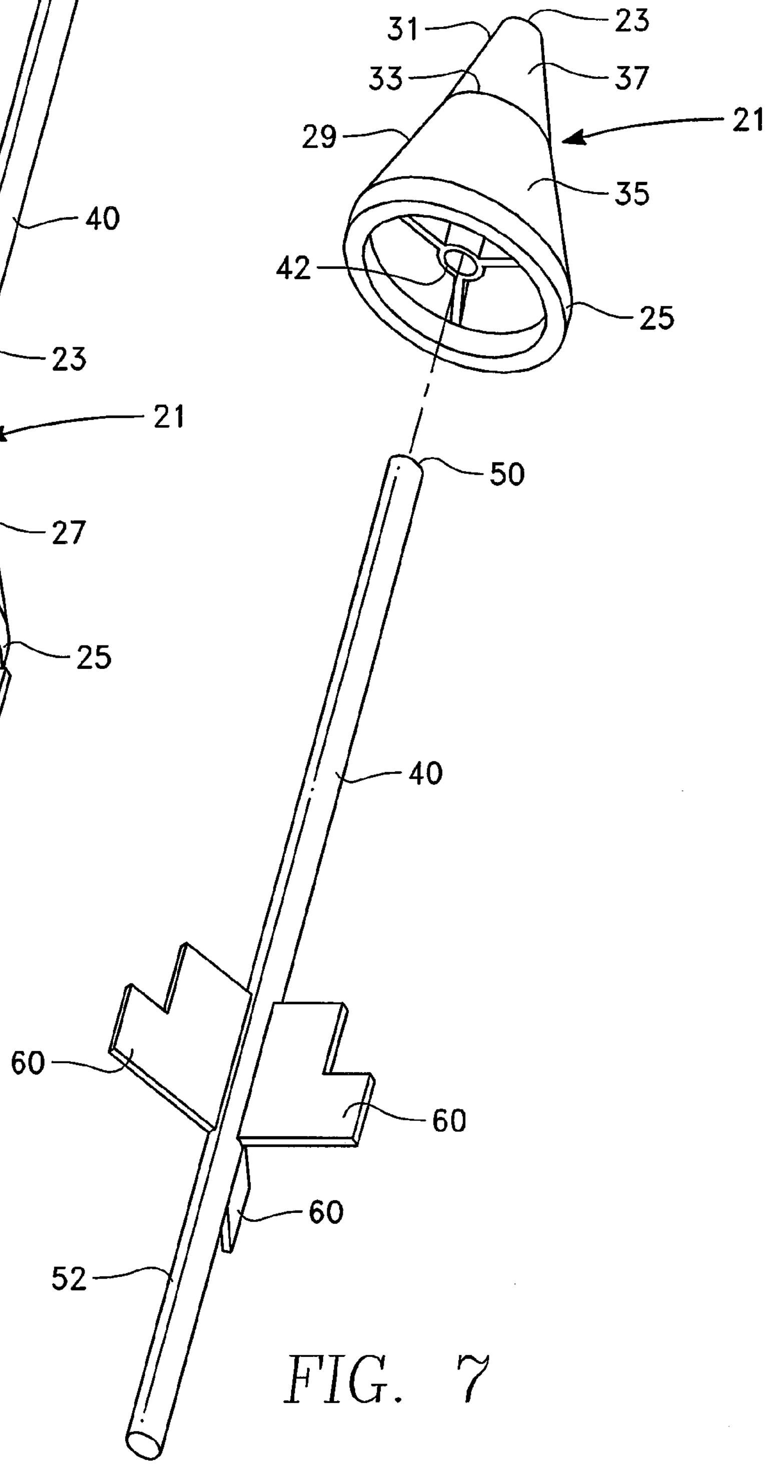
FIG. 7 shows an exploded view of the rod and conical spin plate depicted in FIG. 6.
Figure 8:
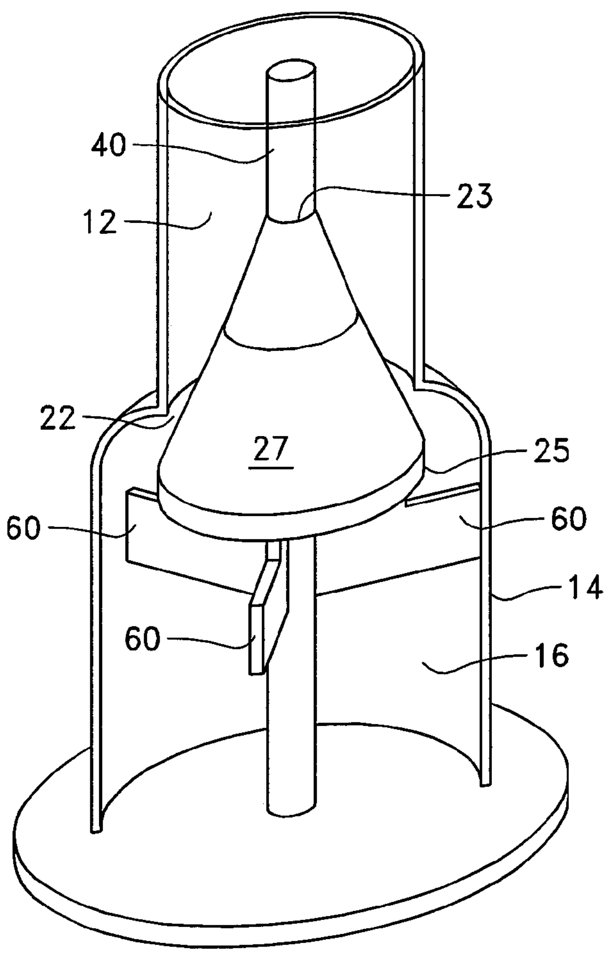
FIG. 8 depicts the positioning of the rod and conical spin plate within the separator.

FIGS. 2-3 generally depict a centrifugal separator 10 comprising the present invention. As shown in FIGS. 2-3, the improved separator comprises a separation barrel 12 which is contained within an outer housing 14. A collection chamber 16 is located at the lower end of the separator. It may be seen by comparing FIGS. 1 and 3 that embodiments of the present invention may form the separation barrel 12 immediately within the outer housing 14, without the need of the intermediate wall structure utilized by the separator in FIG. 1. Collection chamber 16 collects separated solids from the downward liquid flow. A drain port 18 at the bottom end of the collection chamber 16 enables the solids and some liquids to be drawn from it, either continuously or from time to time.

At or near the lower end of the separation barrel 12 there is a spin structure 20 which generally extends normal to the central axis of the separation barrel. Spin structure 20 may comprise a spin plate similar to that of spin plate 112 of the separator 100 depicted in FIG. 1. Alternatively, spin structure 20 may comprise the truncated conical configuration best depicted in FIG. 3. In this embodiment, spin structure 20 comprises a truncated cone 21 having a top 23 and a base 25. The truncated cone 21 comprises an exterior conical surface 27 which extends axially from the base 25 to the flat top surface 23. Spin structure 20 may comprise a lower section 29 and an upper section 31. In this embodiment, lower section 29 comprises a first base 25 (the same base as before). Lower section 29 further comprises a top 33. A first axially-extending conical surface 35 extends from the first base 25 to the first top 33. Similarly, the upper section 31 comprises a second base which is defined by first top 33, because the top of the lower section 29 is also the base of the upper section. The top of the upper section is defined by the top 23 of the spin structure. A second axially-extending conical surface 37 extends from the second base 33 to the top 23.

An annular opening 22, or other conduit means is left between the spin structure 20 and the inside wall of the outer housing 14, which allows the passage of solids from the separation barrel 12 into the collection chamber 16. An outlet barrel 24 is centrally located within the upper end of the separation barrel 12. The outlet barrel 24 includes an exit tube 26 for exit of treated liquid.

An acceptance chamber 28 is formed by the outer housing 14 around the upper end 36 of the separation barrel 12. The acceptance chamber 28 is annularly-shaped and fits around and in fluid-sealing relationship with upper end 36 of the separation barrel 12 and is separated from the lower portion of the separation barrel by dividing wall 30. An injector nozzle 32 through the wall of the outer housing 14 is directed tangentially into the upper end of the acceptance chamber 28, above the upper end 36 of the separation barrel 12. The injector nozzle 32 injects the solid-laden liquid stream under pressure into the acceptance chamber 28. This creates a circular flow between wall 34 of the outer housing 14 and the outside wall of the upper end 36 of the separation barrel 12. Entrance slots 38 through the wall of the upper end 36 of the separation barrel 12 pass the stream from the acceptance chamber 28 into the separation barrel. Entrance slots 38 may be tangential to promote the tangential flow pattern of the fluid. However, it is to be appreciated that other mechanisms may be employed to promote a tangential flow pattern.

As with the separator depicted in FIG. 1, the separation of solids from liquids is derived from fields of g force. The stream is injected into the separation barrel 12 at a high velocity, and whirls as a swiftly flowing helically moving stream from the upper end to the lower end of the separation barrel 12. In the separation barrel, the centrifugal forces are much greater than the gravitational force, and particles are forced outwardly by centrifugal action.

The smaller the diameter of the separation barrel 12, the greater the centrifugal force becomes for the same linear speed along the inner surface of the barrel. At or near a lower end of the separation barrel 12, the spin structure 20 induces a spiral motion to the stream, thus creating a vortex. The liquid comprising the vortex flows away from the spin structure 20 upward towards the outlet barrel 24 (or vortex finder) and out through the exit tube 26.

Figure 9:
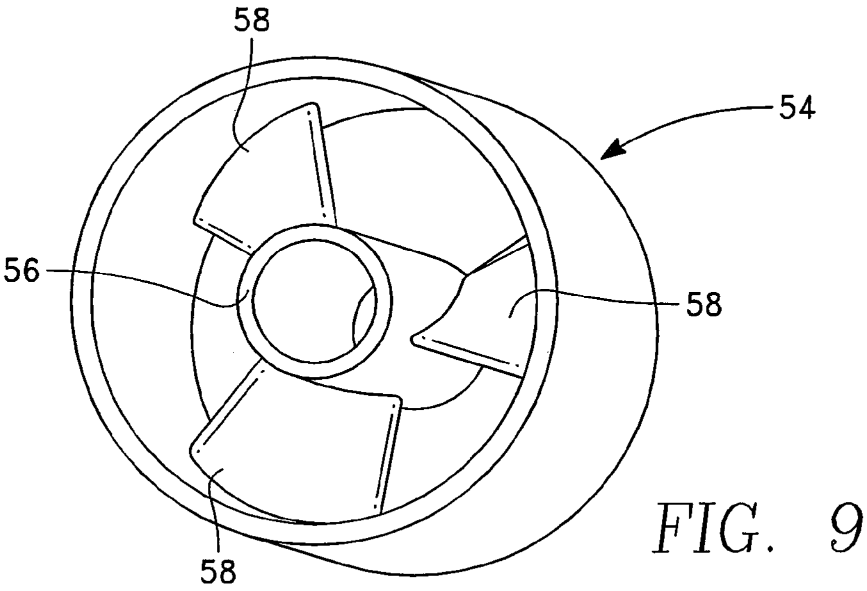
FIG. 9 depicts a cross-section of the outlet barrel, showing an embodiment of an internal support structure which may be utilized for securing the upper end of the rod within the outlet barrel.

Distinctive from the known separators is the disposition of rod 40 between the spin structure 20 and the outlet barrel 24. Rod 40 may be hollow or solid. Rod 40 is centrally aligned within spin structure 20 and maintained in position by hub 42. Rod 40 comprises an upper end 50 and may comprise a lower end 52, which extends below the spin structure 20. The upper end 50 is disposed within a portion of outlet barrel 24. As shown in FIG. 9, which depicts a cross-section of the outlet barrel 24, the outlet barrel may comprise an internal support structure 54 which is utilized for securing the upper end 50 of the rod 40 within the outlet barrel 24.

The internal support structure 54 may not be necessary on smaller units and very large units. The support structure 54 may comprise a central hub 56 into which the upper end 50 of the rod 40 is inserted. The support structure 54 may further comprise flow vanes 58, through which the rising fluid stream flows. The flow vanes may be comprise a shape and pitch which further stabilizes the flow of the fluid stream. The benefits of the flow vanes 58 are particularly noticed in the start up and shut down of the separator, and during the opening and/or closing of valves. The flow vanes 58 help keep the flow trajectories inside the separator intact for longer periods of time, thus minimizing the drops of solids removal efficiency which are typically observed when there are abrupt changes in flow. As depicted in FIG. 9, flow vanes 58 may be impeller-shaped and comprise pitched downward facing edges. The impeller shape minimizes pressure losses in the upward flowing stream by orienting the flow vanes 58 to be at the same angle as the flow stream entering the outlet barrel 24. The inventor herein has found that an acceptable form of flow vanes 58 may have an angle of approximately 20 degrees from the horizontal plane at the point of attachment to the inside wall of the outlet barrel 24 and an angle of approximately 60 degrees where the flow vanes attach to the central hub 56.

Rod 40 may also comprise radial support members 60 which attach to the lower end 52 of the rod, where the radial support members are affixed to the inside wall of the collection chamber 16. It is to be appreciated that the beneficial flow characteristics of the present invention are induced, in part, by the portion of the rod 40 which is between the top 23 of spin structure 20 and the outlet barrel 40. Therefore, while the portion of rod 40 inserted within spin structure 20 may be beneficial in terms of supporting the spin structure and providing stability to the rod, other embodiments of the present invention may have rods which are configured differently below the spin structure.

As shown in FIG. 3, outer housing 14 may comprise a top 44 and a bottom 46. In this configuration, the diameter of the separator 10 increases below the flat top surface 23 of the spin structure 20 from a first diameter to a second diameter, where the first diameter comprises the inside diameter of the separation barrel 12 and the second diameter comprises the inside diameter of the collection chamber 16. The increasing diameter of the collection chamber 16 defines a shoulder section 48 between the separation barrel 12 and the collection chamber 16, where the shoulder section extends from the bottom of the separation barrel to the top of the collection chamber. In this configuration, an opening 22 is defined between the shoulder section 48 and the spin structure 20. This opening provides a conduit means between the spin plate and the sump region for passage of liquid and solids into the collection chamber 16.

While the above is a description of various embodiments of the present invention, further modifications may be employed without departing from the spirit and scope of the present invention. Thus the scope of the invention should not be limited by the specific structures disclosed. Instead the true scope of the invention should be determined by the following appended claims.

What is claimed is:

1. In a separator for separating solids from liquid in a liquid/solid mixture, said separator being of the type which includes a separation barrel having a central axis, an upper end, a lower end, a bottom, an interior wall which is an axially-extending cylindrical surface of rotation, inlet means extending through said wall to inject the mixture into said upper end in a spinning motion to separate solids from the liquid by centrifugal force, a spin structure in axial adjacency to said lower end of said separation barrel, the separator further comprising a collection chamber having a top and a sump region below said spin structure for receiving solids-containing material, the separator further comprising conduit means between the spin structure and said sump region through which conduit means passes said solids-containing material, and the separator further comprising an outlet barrel centrally aligned within said separation barrel, the outlet barrel axially above the spin structure to receive fluid reflected by said spin structure, the outlet barrel comprising a lower end, an upper end, and an inside wall, the improvement comprising:

a rod extending between said spin structure and the lower end of the outlet barrel, the rod centrally aligned within the separation barrel and the outlet barrel.

2. The separator of claim 1 wherein the spin structure comprises a truncated cone, the truncated cone comprising a top, a base, and an axially-extending conical surface extending from the base to the top.

3. The separator of claim 2 wherein the diameter of the separator increases below the top of the spin structure from a first diameter to a second diameter, the first diameter comprising the inside diameter of the separation barrel and the second diameter comprising the inside diameter of the collection chamber.

4. The separator of claim 3 wherein the diameter incrementally increases from the first diameter to the second diameter, the increasing diameter defining a shoulder section between the separation barrel and the collection chamber, the shoulder section extending from the bottom of the separation barrel to the top of the collection chamber.

5. The separator of claim 4 wherein an opening is defined between the shoulder section and the truncated cone, the opening comprising the conduit means between the spin structure and the sump region.

6. The separator of claim 2 wherein the truncated cone comprises a lower section and an upper section, wherein the lower section comprises a first base and a first top, and a first axially-extending conical surface extends from the first base to the first top and the upper section comprises a second base, defined by the first top, and a second top.

7. The separator of claim 6 wherein the first axially-extending conical surface comprises a first locus of points, the first locus of points defining a first line between the first base and the first top, the first line having a first slope and the second axially-extending conical surface comprises a second locus of points, the second locus of points defining a second line between the second base and the second top, the second line having a second slope, wherein the first slope is less than the second slope.

8. The separator of claim 2 wherein the truncated cone is supported by a plurality of radial supports attached to the inside of the collection chamber.

9. The separator of claim 1 wherein the rod comprises an upper end attached within the lower end of the outlet barrel.

10. The separator of claim 1 wherein the rod is hollow.

11. The separator of claim 1 wherein the rod comprises an upper end wherein the upper end is centrally supported within the outlet barrel by an internal support structure.

12. The separator of claim 11 wherein the central support structure comprises a plurality of radial supports extending between the upper end of the rod and the inside wall of the outlet barrel.

13. The separator of claim 11 wherein the central support structure comprises a central hub supported into which the upper end of the rod is inserted, wherein the central hub is supported within the outlet barrel by a plurality of flow vanes.

14. The separator of claim 13 wherein the outlet barrel comprises means for minimizing pressure drop through the outlet barrel.

15. The separator of claim 14 wherein the means of minimizing pressure drop through the outlet barrel comprises configuring the flow vanes in the shape of an impeller.

16. The separator of claim 13 wherein the flow vanes are each angled ranging from 20 degrees to 60 degrees from a horizontal plane.

17. The separator of claim 13 wherein adjacent to the attachment of the flow vanes to the inside wall of the outlet barrel, the flow vane has an angle of approximately 20 degrees from a horizontal plane.

18. The separator of claim 13 wherein adjacent to the attachment of the flow vanes to the central hub, the flow vane has an angle of approximately 60 degrees from a horizontal plane.

* * * * *